United States Patent [19]

Ito et al.

[11] 4,160,595

[45] Jul. 10, 1979

[54] COPYING MACHINE EQUIPPED WITH A FLASH TYPE FIXING APPARATUS

[75] Inventors: Kenzo Ito, Kodaira; Yoshiharu Abe, Tokyo, both of Japan

[73] Assignee: Copyer Co., Ltd., Tokyo, Japan

[21] Appl. No.: 919,719

[22] Filed: Jun. 27, 1978

[51] Int. Cl.2 ...................... G03G 15/00; G03B 27/76; F27B 9/28

[52] U.S. Cl. ................................. 355/3 FU; 219/216; 355/14; 355/71; 432/60

[58] Field of Search ................. 355/3 R, 3 FU, 3 SH, 355/14, 71, 133; 219/216; 432/60

[56] References Cited

U.S. PATENT DOCUMENTS

| | | | |
|---|---|---|---|
| 2,852,651 | 9/1958 | Crumrine et al. | 355/3 FU X |
| 3,445,626 | 5/1969 | Michaels | 355/3 FU X |
| 3,765,828 | 10/1973 | Lux | 355/3 FU X |
| 3,819,259 | 6/1974 | Lux | 355/3 R |

*Primary Examiner*—Fred L. Braun

*Attorney, Agent, or Firm*—Frishauf, Holtz, Goodman and Woodward

[57] ABSTRACT

A copying machine equipped with a flash type fixing apparatus includes at least two light shielding shutters adapted to prevent a light resulting from flashing of the flash type fixing apparatus from reaching a photosensitive layer through a conveying path between the photosensitive layer and the flash type fixing apparatus.

8 Claims, 3 Drawing Figures

COPYING MACHINE EQUIPPED WITH A FLASH TYPE FIXING APPARATUS

BACKGROUND OF THE INVENTION

This invention relates to a copying machine-equipped with a flash type fixing apparatus.

With a conventional copying machine, a light emitted from a flash type light emitter leaks toward a photosensitive layer through a copying paper conveying path. For this reason, toner powders left on the photosensitive layer and its neighboring devices are deposited onto these parts or devices, and it is very difficult to clean them. Furthermore, since a light emitted from the flash type light emitter is very intense, the photosensitive layer of the photosensitive body is destroyed when a light is emitted, thus losing or degenerating the photosensitive characteristic of the photosensitive layer of the photosensitive body. As a result, a lengthy time is required for its characteristic to be regained, thus providing an obstacle to the copying operation.

SUMMARY OF THE INVENTION

It is accordingly the object of this invention to provide a copying machine equipped with a flash type fixing apparatus which can prevent a light resulting from flashing of the flash type fixing apparatus from reaching a photosensitive layer through a conveying path between the flash type fixing apparatus and the photosensitive layer.

BRIEF DESCRIPTION OF THE DRAWING

This invention will now be described by way of example by referring to the accompanying drawing sheets in which.

DESCRIPTION OF THE PREFERRED EMBODIMENT

Figure 1:
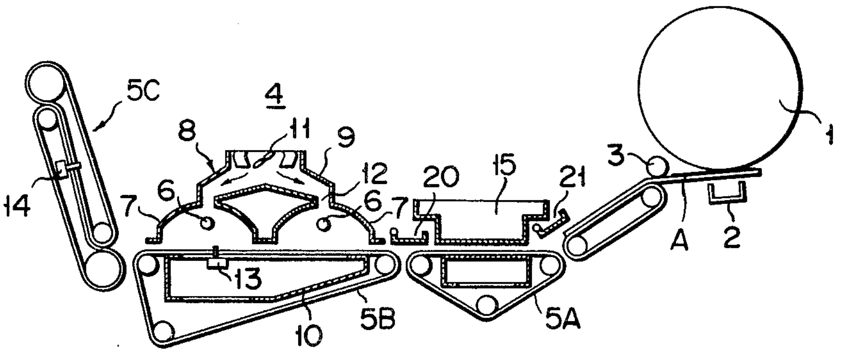
FIG. 1 is a side view, partly in cross section, showing a copying machine according to this invention which includes a flash type fixing apparatus with a flash shutter.

In FIG. 1, reference numeral 1 shows a drum type light sensitive layer of a transfer type electrostatic copying machine; 2 a transfer device for electrostatically transferring a toner powder image on the outer peripheral surface of the photosensitive layer 1 onto a copying paper A sent from a paper supply mechanism not shown; 3 a separation roll for separating the so transferred copying paper A away from the outer peripheral surface of the photosensitive layer 1; 15 a light shielding wall disposed above a conveying path 5A; and 4 a fixing apparatus for fixing the so transferred tone powder image on the copying paper A onto the copying paper A. The fixing apparatus 4 comprises a flash discharge tube 6 located above a belt type copying paper conveying path 5B, a reflector 7 having a spherically curved surface to permit a light from the discharge tube to be reflected on copying paper onto the conveying path 5B, and a gas removing device 8 for removing gas evolved in the fixing of the toner powder image to the copying paper. The gas removing apparatus 8 comprises a cylindrical air blower 9 mounted thereon to communicate with the reflector 7 and a gas suction chamber 10 disposed below the conveying path 5. The air blower 9 has a fan 11 at its upper end to permit air to be blown down toward the conveying path through an air inlet 12 opened in the reflector 7. It is preferred that the air inlet 12 be located immediately above the discharge tube 6.

A first microswitch 13 is attached to the conveying path 5B. The first microswitch 13 is of a 3-way changeover switch adapted to be energized by a copying paper A conveyed. The first microswitch 13 is located in such a position that when a copying paper of, for example, A4 size comes within a fixing zone of the flash type fixing apparatus 4, the microswitch 13 is energized by the leading edge of the copying paper. The copying paper A delivered from the flash type fixing apparatus 4 is carried outward by a conveying path 5C. A second microswitch 14 is disposed on the conveying path 5C. The second microswitch 14 is located in such a position that it is energized when the trailing half of the copying paper A of A3 size (A4 size) comes within the fixing zone of the flash type fixing apparatus 4. First and second light shielding shutters 20 and 21 are disposed at each end of the conveying path 5A and in the neighborhood of a light shielding member 15 which is disposed between the flash fixing apparatus 4 and the photosensitive body 1. That is, the first light shielding shutter 20 is spaced apart from the first microswitch 13 such that the distance between the first light shielding shutter 20 and the first microswitch 13 is sufficiently longer in length than the length of the copying paper of A4 size, and the second light shielding shutter 21 is spaced a distance between the second light shielding shutter 21 and the first microswitch 13 is sufficiently longer in length than the length of the copying paper of A3 size.

Figure 2:
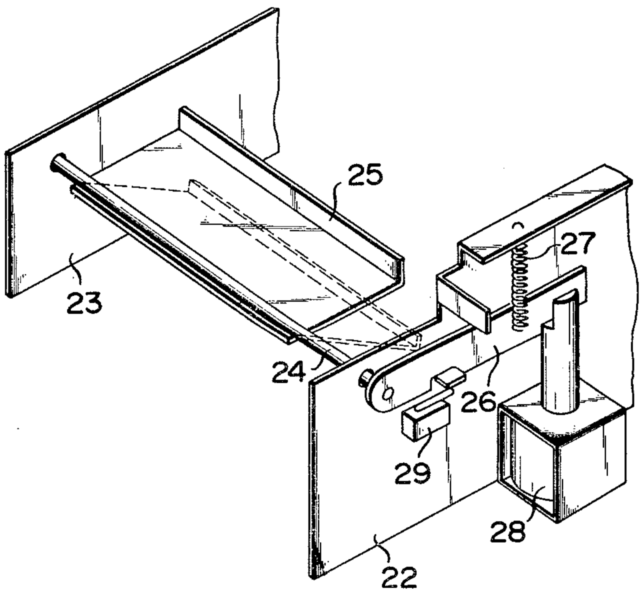
FIG. 2 is a perspective view, partly broken away, showing a light shielding shutter of the flash type fixing apparatus.

The light shielding shutters 20, 21 comprises, as shown in FIG. 2, first and second support plates 22 and 23 disposed parallel to each other, a rotating rod 24 extending through the support plates 22, and 23, a light shielding plate 25 having one end secured to the rotating rod 24, an operating arm 26 disposed on the side of the first support plate 22 and having one end secured to one end of the rotating rod 24, a spring 27 anchored to the top surface of the first support plate 22 and adapted to urge the other end of the operating arm 26 upward, and an electromagnetic solenoid 28 for attracting the other end of the operating arm 26 downward against the urging force of the spring. When the electromagnetic solenoid 28 is deenergized, the other end of the operating arm 26 is urged up under the force of a spring 27 and the light shielding plate 25 is in the open position as indicated by solid lines in FIG. 2. When the electromagnetic solenoid 28 is energized, the other end (rear end) of the operating arm 26 is attracted down to cause the light shielding plate 25 to be closed as indicated by dotted lines. A device switch 29 for operating the flash type discharge tube 6 is disposed on the side of the first support plate 22. When the other end of the operating arm 26 is attracted downward by the electromagnetic solenoid, the drive switch 29 is actuated by the operating arm 26.

Figure 3:
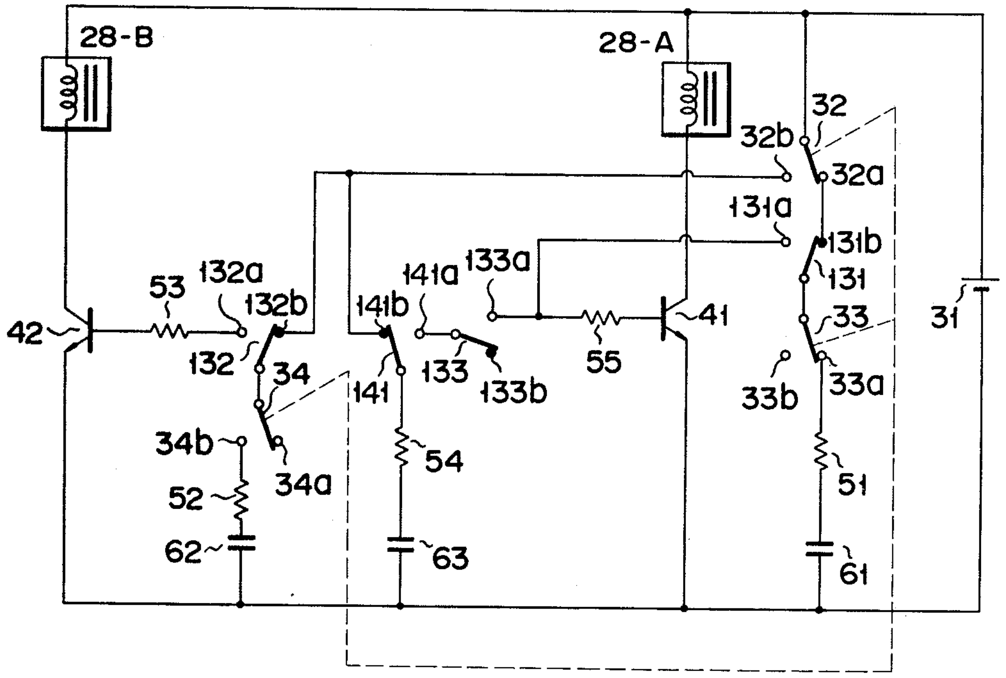
FIG. 3 shows a control circuit diagram of the light shielding shutter.

FIG. 3 shows a control circuit of the above-mentioned first and second light shielding shutters 20 and 21. In FIG. 3, 31 shows a DC power source; 32, 33 and 34 three-way changeover switches which, when the copying paper A is set to an [A4] or [A3] size, effect a switching operation according to the setting operation; and 131, 132 and 133 three-way changeover switches for the first microswitch 13. An electromagnetic solenoid 28-A on the first light shielding shutter 20 is connected through a first NPN type transistor to the DC power source 31. An electromagnetic solenoid 28-B on the second light shutter 21 is connected through a second NPN type transistor 42 to the DC power source 31. A first capacitor 61 is connected to the positive terminal of the DC power source 31 through a series circuit of a resistor 51, A4 contact 33*a* of the changeover switch 33, normally closed contact 131*b* of the changeover switch 131 and A4 contact 32*a* of the changeover switch 32. The first capacitor 61 is connected to the base-emitter path of the first transistor 41 through a series circuit of the resistor 51, A4 contact 33*a* of the changeover switch 33, normally opened contact 131*a* of the changeover switch 131 and resistor 55. A second capacitor 62 is connected to the positive terminal of the DC power source 31 through a resistor 52, A3 contact 34*b* of a changeover switch 34, normally closed contact 132*b* of the changeover switch 132, and A3 contact 32*b* of a changeover switch 32. The second capacitor 62 is connected to the base-emitter path of a second transistor 42 through a resistor 52, A3 contact 34*b* of the changeover switch 34, normally opened contact 132*a* of the changeover switch 132 and resistor 53. A third capacitor 63 is connected to the positive terminal of the DC power source 31 through a series circuit of a resistor 54, normally closed contact 141*b* of the second microswitch 141 and A3 contact 32*b* of the changeover switch 32. The third capacitor 63 is connected to the base-emitter path of the first transistor 41 through the resistor 54, normally opened contact 141*a* of the second microswitch 14, normally opened contact 133*a* of the changeover switch 133 and resistor 55. The A3 contact 33*b* of the changeover switch 33, A4 contact 34*a* of the changeover switch 34 and normally closed contact 133*b* of the changeover switch 133 are dead contacts.

Explanation will now be given to the copying of an A4 size copying paper on the copying machine according to this invention.

An A4 size copying paper setting button (not shown) is depressed to make a setting to an A4 size and A4 contacts 32*a*, 33*a* and 34*a* of changeover switch 32, 33, 34 are closed, respectively. In this state, the first capacitor 61 is charged through the resistor 51. An image bearing copying paper (A4 size) through the photosensitive body 1 passes through the conveying path 5A and carried to the flash type fixing apparatus 4. When the first microswitch 13 is energized by the copying paper A, the normally opened contacts 131*a*, 132*a* and 133*a* of the changeover switches 131, 132 and 133 are closed. A voltage across the first capacitor 61 is applied across the base-emitter path of the first transistor 41, causing the transistor to be turned ON to permit the electromagnetic solenoid 28-A to be energized. When the solenoid 28-A is energized, the operating arm 26 is swung down, as shown in FIG. 2, under the force of the spring 27 with one end as a pivot, causing the rod 24 to be rotated. As a result, the first light shielding shutter 20 is closed. When, on the other hand, the operating arm 26 is rotated to cause the drive switch 29 to be energized in synchronism with the completion of closure of the light shielding shutter, the flash type fixing apparatus 4 flashes, causing the toner powder image to be fixed to the copying paper A. A light resulting from the flashing of the fixing apparatus is prevented from reaching the photosensitive body by the first light shielding shutter 20. In this case, the closing time of the first shutter 20 is set to the time sufficiently greater than the flashing time of the flash emitter 6, for example 0.5 sec. Since the A4 size copying paper A, when in the first microswitch 13 energizing state, has been entered into the fixing zone, a positive fixing is effected over the whole surface of the copying paper. When the first microswitch 13 is energized, the normally opened contacts 132*a* and 133*a* of the changeover switches 132 and 133 are closed and, since no closed circuit is established by the closure of the switches 132*a* and 133*a*, the circuit operation remains unchanged. When the trailing edge of the copying paper A passes above the first microswitch 13, the latter is returned to the original deenergizing state and the normally closed contacts 131*b*, 132*b* and 133*b* of the changeover switches 131, 132 and 133 are closed. The first capacitor 61 begins to be charged in readiness for the next operation.

In the case of an A3 size copying paper, an A3 size copying paper setting button (not shown) is depressed to make a setting to an A3 size, and the A3 contacts 32*b*, 33*b* and 34*b* of the changeover switches 32, 33 and 34 are closed. In this state, the second capacitor 62 is charged through the resistor 52 and the third capacitor 63 is charged through the resistor 54. An image bearing copying paper (A3 size) through the photosensitive layer 1 passes through the conveying path 5A and supplied to the fixing device 4. When the copying paper A energizes the first microswitch 13, the normally opened contacts 131*a*, 132*a* and 133*a* of the changeover switches 131, 132 and 133 are closed, and a voltage across the second capacitor 62 is applied to the base-emitter path of the second transistor 42, causing the second transistor 42 to be turned ON to permit the electromagnetic solenoid 28-b to be energized. When the electromagnetic solenoid 28-B is energized, the operating arm 26 is swung down, as shown in FIG. 2, against the force of the spring 27 with one end as a pivot to cause the rotating rod 24 to be rotated. Thus, the second light shielding shutter 21 is closed. By the pivotal movement of the operating arm 26, the drive switch 29 is turned ON in synchronism with the completion of closure of the light shielding shutter 21 and the flash emitter 6 of the fixing apparatus 4 flashes to cause the image to be fixed to the leading half of the copying paper A. A light from the flashing of the fixing apparatus is prevented from reaching the photosensitive body by the second light shielding shutter 21. The closing time of the second light shielding shutter 21 is set to the time sufficiently greater than the flashing time of the flash emitter 6, for example, 0.5 sec. The second light shielding shutter 21 is opened by the deenergization of the electromagnetic solenoid 28-B and the copying paper A is transferred to the conveying path 5C. When the second microswitch 14 is energized by the copying paper A and the normally opened contact 141*a* is closed, a voltage across the third capacitor 63 is applied to the base-emitter path of the first transistor 41. The first transistor 41 is turned ON, the electromagnetic solenoid 28-A is energized and the first light shielding shutter is closed. The flash emitter 6 flashes in response to the completion of closure of the first light shielding shutter 20 and the flash emitter 6 gives a flash to the copying paper A to cause the image to be fixed to the trailing half of the copying paper A. The light from the flashing of the flash emitter 6 is prevented from reaching the photosensitive body by the first light shielding shutter 20. Then, when the trailing edge of the copying paper passes above the microswitch 13, the first microswitch 13 is returned to the original deenergizing state to cause the normally closed contacts 131*b*, 132*b* and 133*b* to be closed. The second capacitor 62 begins to be charged in readiness for the next operation. When the trailing edge of the copying paper A passes above the second microswitch 14 the second microswitch 14 is returned to the original deenergizing state, causing the normally closed contact 141*b* to be closed. The third capacitor 63 begins to be charged ready for the next operation.

In the prior art copying machine, since the toner powders left on the photosensitive layer 1 and its neighboring devices are deposited thereon, the cleaning operation is very difficult, and the characteristic of the photosensitive layer of the photosensitive body is not lost, longer time is required for its initial characteristic to be regained, providing an obstacle to the copying operation. According to this invention, however, these problems do not occur, since when the A4 size copying paper is used, a light resulting from the flashing of the flash type fixing apparatus is prevented from reaching the photosensitive layer 1 by the first light shielding shutter 20 and since in the case of the A3 size copying paper, a light resulting from the flashing of the flash type fixing apparatus is prevented by the first and second light shielding shutters 20 and 21 from reaching the photosensitive layer 1.

With the copying machine according to this invention which is adapted to flash an image bearing copying paper by the flash type fixing apparatus the light shielding shutter is mounted between the flash type fixing apparatus and the photosensitive layer to permit the light shielding shutter to be closed during the flashing of the flash type fixing apparatus. In consequence, it is possible to prevent an illumination resulting from the flashing of the fixing apparatus from reaching the photosensitive layer during the flashing of the fixing apparatus.

What we claim is:

1. A copying machine equipped with a flash type fixing apparatus, comprising a photosensitive layer, a flash type fixing apparatus for fixing a toner powder image transferred from the photosensitive layer onto a copying paper, light shielding shutter means disposed between the fixing apparatus and the photosensitive layer, and control means for closing said light shielding shutter means during the flashing of said fixing apparatus to prevent an illumination resulting from the flashing of the fixing means from reaching the photosensitive layer.

2. A copying machine according to claim 1, in which a conveying path is provided to carry the copying paper from the photosensitive layer to the fixing apparatus and said light shielding shutter means is provided on the conveying path to prevent light from reaching the photosensitive layer through said conveying path.

3. A copying machine according to claim 2, in which said light shielding shutter means includes first and second shutters which are operated in cooperation with first and second switches above the conveying path to close the conveying path.

4. A copying machine according to claim 3, in which said light shielding shutter means comprises a light shielding member disposed between mutually parallel supports, a spring anchored to the top surface of one of the supports, an operating arm having one end secured to the light shielding member and the other end urged upward by said spring, and an electromagnetic solenoid adapted to, when excited, swing said operating arm downward.

5. A copying machine according to claim 4, in which a switch is further provided, said switch being operated by the downward swinging movement of the operating arm and adapted to permit a flash to be emitted when the switch is turned ON.

6. A copying machine according to claim 5, in which said light shielding member comprises a rod provided between the supports and adapted to be rotated through said operating arm by the energization of the electromagnetic solenoid, and a rectangular light shielding plate having one side edge fixed to said rod.

7. A copying machine according to claim 1, in which said flash type fixing apparatus includes gas removing means for removing gas evolved during the fixing of said flash type fixing apparatus.

8. A copying machine according to claim 7, in which said gas removing means includes an air blower mounted in communication with a reflector to blow air down toward a conveying path, and a gas suction chamber for causing air forced down by the air blower to be exhausted therethrough.

* * * * *